Nov. 4, 1969 R. W. HOUSER 3,476,940
PHOTOMULTIPLIER SYSTEM WHEREBY DYNODE VOLTAGE SUPPLY IS VARIED
IN ACCORDANCE WITH MODULATION OF INCIDENT LIGHT, HOLDING
OUTPUT CURRENT CONSTANT AND USING MEASURE OF DYNODE
VOLTAGE AS MEASURE OF MODULATION OF LIGHT
Filed Dec. 12, 1967
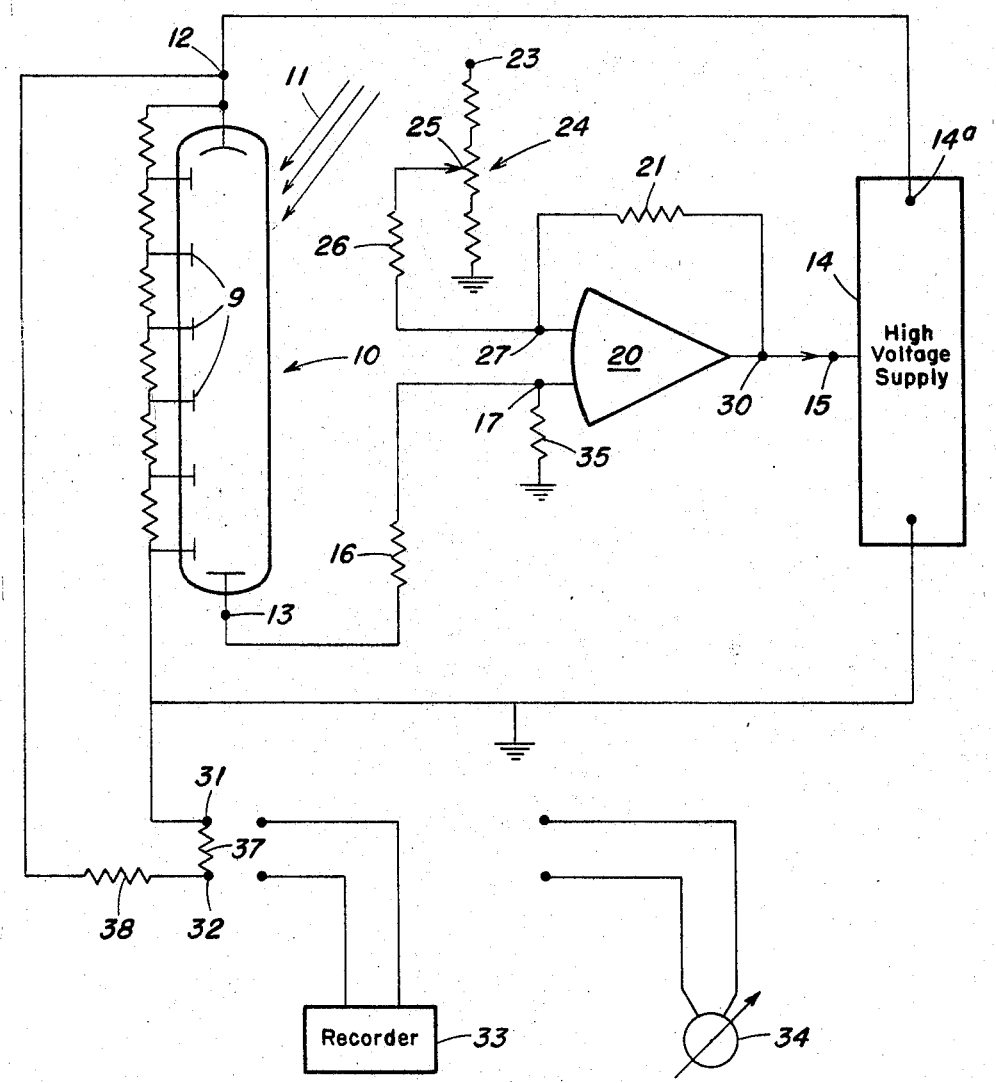
*INVENTOR.*
Robert W. Houser
BY
*Edward H Loneman*
ATTORNEY

United States Patent Office 3,476,940
Patented Nov. 4, 1969

3,476,940
PHOTOMULTIPLIER SYSTEM WHEREBY DYNODE VOLTAGE SUPPLY IS VARIED IN ACCORDANCE WITH MODULATION OF INCIDENT LIGHT, HOLDING OUTPUT CURRENT CONSTANT AND USING MEASURE OF DYNODE VOLTAGE AS MEASURE OF MODULATION OF LIGHT
Robert W. Houser, Vestal, N.Y., assignor to General Aniline & Film Corporation, New York, N.Y., a corporation of Delaware
Filed Dec. 12, 1967, Ser. No. 689,960
Int. Cl. H01j 39/12
U.S. Cl. 250—207          4 Claims

ABSTRACT OF THE DISCLOSURE

This invention is concerned with extending the linear range of a densitometer by using the energizing voltage of a photo-multiplier tube as a measure of density. In operation the output current from the anode of the photo-multiplier tube is compared with a reference current by an operational amplifier. The amplifier output is used to control a variable voltage source which enegrizes the photo-multiplier tube, such that the output current from the tube is maintained equal to the reference current.

---

This invention relates to densitometers and more particularly to improvements in such apparatus which extend the measuring range of photo-multiplier tubes.

The density of film strips and the like is usually measured by illuminating a sample, and measuring reflected, or transmitted light in densitometers which include a photo-multiplier tube. The current through the tube changes as the amount of light transmitted to the tube changes, and the variation in current level, which can be measured and recorded, is thus a measure of the variation in density of the sample to be tested.

It has been found that in measuring the light density of film the current through the tube is linear with respect to impinging light over a very limited range of densities. That is, too much light will saturate the tube and too little light will not produce a usable output signal, unless the dynode voltage is changed. Apparatus and circuits to change this voltage are normally intricate, cumbersome, expensive and require an operator. For example, one such solution for extending the linear range of a photo-multiplier tube is to provide a range switch to change the dynode voltage of the tube in steps. The range switch, controlling the dynode level, can then be used with such a tube, to maintain the current change approximately linear, within a certain range, with respect to light impinging on the tube. Such range changing is, however, inconvenient when the apparatus is to be used in connection with automatic recording equipment or in any automatic system.

The present invention overcomes the foregoing and other short-comings and disadvantages encountered in prior art densitometers by connecting the output from a photo-multiplier tube to an operational amplifier, where the output is compared with a reference, to obtain an error signal which is then used to control a variable voltage dynode supply, so that the current through the tube is constrained to be constant, while the dynode supply voltage to the tube varies in accordance with impinging light. By constraining the current to be a constant value, and preferably one in the center of the design value for the tube, and varying the dynode supply, the linear range of operation of the tube can be extended substantially. Whereas densitometers in accordance with the prior art were able to measure a density range of from 0 to 1, on a given scale, the apparatus of the present invention is able to measure densities within a range of 0 to 4, that is, from completely transparent to entirely black.

Essentially, therefore, the invention provides a densitometer in which a photo-multiplier tube is connected in a feed-back circuit which constrains the current through the tube to be constant, and develops an error signal controlling the dynode voltage, the variation in the dynode voltage being a measure of the variation in density.

Accordingly, it is the primary object of the present invention to provide a densitometer having a wider range of measurement than heretofore available.

Another object of the present invention is to provide a novel and unique photo-multiplier circuit which provides for a wide range of measurement in which the measuring characteristic is linear with respect to the density to be measured.

Still another object of the present invention is to provide a densitometer which is versatile, does not require range switching and accepts a wide range of variation in density to be measured.

It is a further object of the present invention to provide a densitometer which enables automatic reading of density over a wide range, and which is capable of being connected to automatic recorders.

A more specific object of the present invention is to provide a densitometer for furnishing a continuously variable output signal directly representative of density to be measured, over a wide range, and without any range switching.

These and other objects and many of the attendant advantages of this invention will be readily appreciated as th same becomes better understood by reference to the following detailed description when considered in connection with the accompanying drawing, in which the single figure is a schematic circuit diagram of the densitometer in accordance with the present invention.

Referring now in particular to the drawing, wherein like reference characters designate like or corresponding parts throughout, there is shown a photo-multiplier tube generally designated as reference numeral 10 which is exposed to reflected or transmitted light, as schematically indicated by arrows 11, from a specimen which may be an undeveleooped film strip, an exposed film, photographic papers or the like.

The photo-multiplier tube 10 is connected with the usual dynode chain 9 and has a cathode and an anode terminal 12 and 13, respectively. Terminal 12 is connected to an energizing high voltage supply 14, which has a variable voltage output at 14a. A commercial example of such a voltage supply is Kepco model ABC. This voltage supply is automatically controled by an input signal applied to a control terminal 15 on the high voltage supply 14.

Terminal 13 is connected over a compensating resistor 16 to one input 17 of an operational amplifier 20. The operational amplifier 20 may, provide for amplification, for example by a factor of 5, by suitable choice of its feed-back resistor 21 and resistor 35.

A source of reference voltage (not shown) is connected to a terminal 23. A voltage divider 24 is connected to terminal 23 and has a tap point 25 connected over a compensating resistance 26 to the other input terminal 27 of operational amplifier 20. The output of the operational amplifier 20, appearing at terminal 30, will be the difference between the current signal appearing at terminal 17 and the reference current signal appearing at terminal 27. It is this output signal which is used to control the output of the high voltage supply 14 such that this current difference will be zero. In other words, the operational amplifier will apply a signal which will control the high voltage supply in such a manner that the current through the photo-multiplier tube 10 will remain constant, regardless of incident light. The reference current signal can be set by moving the tap point 25 on the voltage divider 24, preferably for the midrange of current with respect to the rated design value of the particular tube 10 being used. Tap point 25 may be periodically changed to compensate for changes in the sensitivity of the photo-multiplier tube due to aging etc.

The voltage across the tube 10 will thus vary in accordance with incident light, which is a measure of the density of the sample to be tested. This variation in voltage will appear across terminals 31, 12 to which a recorder 33, or a direct reading instrument 34 may be connected.

Most recorders will not accept the voltage level across the photo-multiplier tube, which in most instances exceeds 1000 volts. Therefore, a voltage divider in the form of resistances 37 and 38 is connected across terminals 31, 12. The recorder can now be connected across the voltage divider to accommodate its range.

By maintaining the value of the current in the photo-multiplier tube constant through the changing dynode voltage, and utilizing this change in dynode voltage as a measure of the incident light, the linear range of measurement can be substantially extended. The feedback resistance 21 can be selected in such a way that suitable amplification is obtained directly from the operational amplifier 20. Of course, dropping resistances, additional adjustments and the like may be inserted between terminal 30 and terminal 15, or terminal 30 and ground, as may be needed. Circuit elements not necessary for an understanding of the invention have been omitted to simplify specifications and drawing.

From the foregoing it becomes readily apparent that the densitometer of the present invention utilizes a circuit in which the current through a photo-multiplier tube is constrained to be constant, by use of an operational amplifier, the measure of density being a measure of the variation of the dynode voltage required to maintain the current in the photo-multiplier tube constant. The swing in voltage from dark to light, for constant current, may be very wide and for example for a type 7102 photo-multiplier tube may vary from 300 to 1,200 volts, thus providing for a wide linear range of measurement.

It should also be understood that the foregoing relates to only a preferred embodiment of the invention, and that it is intended to cover all changes and modifications of the example of the invention herein chosen for the purposes of the disclosure, which do not constitute departures from the spirit and scope of the invention.

What is claimed is:

1. An extended linear range densitometer for measuring the light density of a specimen comprising:
   a photo-multiplier tube located in light receiving relationship with respect to said specimen and adapted to provide an output current in response to the modulation of the light received therefrom,
   a variable dynode voltage supply connected to said photo-multiplier tube to supply an energizing voltage thereto,
   a source of reference potential,
   comparison means for comparing said output current from said photo-multiplier tube and the current from said reference potential and for deriving an error signal therefrom,
   coupling means for connecting said error signal to said variable dynode voltage supply to change said energizing voltage such that said error signal is reduced to zero, and
   output means coupled to said energizing voltage for measuring said changes of said energizing voltage, said changes corresponding to the modulation of the light received by said photo-multiplier tube.

2. The densitometer as recited in claim 1 wherein said comparison means is an operational amplifier.

3. The densitometer as recited in claim 1 wherein said output means includes a continuously recording recorder.

4. The densitometer as recited in claim 3 wherein said output means further includes a voltage divider.

References Cited
UNITED STATES PATENTS

| | | | |
|---|---|---|---|
| 2,605,430 | 7/1952 | Marcy | 250—207 |
| 2,840,720 | 6/1958 | Van Rennes | 250—207 |

ARCHIE R. BORCHELT, Primary Examiner

MARTIN ABRAMSON, Assistant Examiner